(12) United States Patent
Spada

(10) Patent No.: US 7,596,747 B2
(45) Date of Patent: Sep. 29, 2009

(54) INCREMENTALLY PARSING STYLE SHEETS

(75) Inventor: Peter J. Spada, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 816 days.

(21) Appl. No.: 11/191,100

(22) Filed: Jul. 27, 2005

(65) Prior Publication Data

US 2007/0028167 A1   Feb. 1, 2007

(51) Int. Cl.
  G06F 17/00   (2006.01)
  G06F 9/45    (2006.01)

(52) U.S. Cl. .................... 715/235; 715/236; 715/248; 717/142; 717/145

(58) Field of Classification Search ............... 715/235, 715/236, 248; 717/142, 144, 145
See application file for complete search history.

(56) References Cited

U.S. PATENT DOCUMENTS

| | | | | |
|---|---|---|---|---|
| 5,983,268 | A * | 11/1999 | Freivald et al. | 709/218 |
| 6,941,511 | B1 * | 9/2005 | Hind et al. | 715/235 |
| 7,143,103 | B1 * | 11/2006 | Zisman et al. | 707/102 |
| 7,143,344 | B2 * | 11/2006 | Parker et al. | 715/236 |
| 7,383,498 | B1 * | 6/2008 | Hickl et al. | 715/235 |
| 2007/0143672 | A1 * | 6/2007 | Lipton et al. | 715/530 |
| 2007/0226613 | A1 * | 9/2007 | Tandriono et al. | 715/530 |
| 2008/0098296 | A1 * | 4/2008 | Brichford et al. | 715/234 |

OTHER PUBLICATIONS

"Bison 1.875", Appendix B. Glossary, (C) 2003 Free Software Foundation http://www.delorie.com/gnu/docs/bison/bison_107.html.*
Beetem, J.F.; Beetem, A.F., "Incremental scanning and parsing with galaxy," Software Engineering, IEEE Transactions on, vol. 17, No. 7, pp. 641-651, Jul. 1991 URL: http://ieeexplore.ieee.org/stamp/stamp.jsp?arnumber=83901&isnumber=2738.*
Bos, Bert, Cascading Style Sheets, level 2 revision 1, CSS 2.1 Specification, W3C Working Draft Jun. 13, 2005 http://www.w3.org/TR/2005/WD-CSS21-20050613/css2.pdf.*

* cited by examiner

Primary Examiner—Stephen S Hong
Assistant Examiner—Adam M Queler
(74) Attorney, Agent, or Firm—Merchant & Gould, P.C.

(57) ABSTRACT

A style sheet is incrementally parsed when a change is made. Instead of parsing the entire style sheet text each time a change is made, only a portion of the style sheet is parsed in response to the incremental change. As a result of the incremental parsing the number of data structures needed to be updated upon the incremental change to the style sheet text is minimized. Since only a portion of the data structures are updated, it is possible for other components in software to have smart behavior based on the changes. For example, instead of all the display elements updating their display based on a change to the style sheet, only those dialogs or other parts of the user interface that were showing information about the changed rules need to update their display.

16 Claims, 9 Drawing Sheets

```
                          0              21              602
              605 ─── body { color: blue; }
                          22       38
              610 ─── p { margin: 0; }
                          39              66
              615 ─── /* TODO: add a rule here */
                          67       91
              620 ─── table td { color: red; }
```

```
                          0              21              650
              655 ─── body { color: blue; }
                          22       38
              660 ─── p { margin: 0; }
                          39       59
              665 ─── .foo { padding: 0; }
                          60       84
              670 ─── table td { color: red; }
```

```
          0                    21
605 ─── body { color: blue; }
          22       38
610 ─── p { margin: 0; }
          39                      66
615 ─── /* TODO: add a rule here */
          67                 91
620 ─── table td { color: red; }
```

```
          0                    21
655 ─── body { color: blue; }
          22       38
660 ─── p { margin: 0; }
          39           59
665 ─── .foo { padding: 0; }
          60              84
670 ─── table td { color: red; }
```

*Fig. 6*

INCREMENTALLY PARSING STYLE SHEETS

BACKGROUND

Style sheets are used to define the layout of documents. A style sheet may be used to specify a number of different parameters that are associated with the layout of a document. Some of these parameters include page size, margins, fonts, as well as how headers and links appear within the document. Once created, the style sheet may be associated with one or more documents that may be of different types. For example, one style sheet could be associated with business letters, another style sheet could be associated with personal letters, and another style sheet could be associated with business reports.

There are many different types of style sheets. One example of a style sheet is a Cascading Style Sheet (CSS) that may be used to define how Web pages are displayed. A CSS can help provide HTML documents an attractive and consistent appearance. The CSS contains style definitions that are applied to elements in an HTML document. The CSS styles define how elements are displayed and where they are positioned on the Web page. Instead of assigning attributes to each element on Web pages individually, a general rule may be created within the CSS that applies attributes whenever a Web browser encounters an instance of a particular element.

A parser is used to create the internal data structures that are used to represent the elements contained within the style sheet by reading the entire style sheet file. The data structures are then used when the document is rendered.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A style sheet is incrementally parsed when a change is made to the sheet. Instead of parsing the entire style sheet each time a change is made, only a portion of the style sheet is parsed in response to the incremental change. For example, when a change is made to a single rule within the style sheet, then the single rule affected by the change is parsed instead of parsing every entry within the style sheet. As a result of the incremental parsing, the number of data structures needed to be updated upon the incremental change to the style sheet text is minimized. For example, when the change affects a single rule then only a single data structure is updated.

Since a minimal amount of the style data structures are updated, software components do not have to update every element with each change to the style sheet. For example, instead of all the display elements updating their display based on a change to the style sheet, only those dialogs or other parts of the user interface that were showing information about the changed rules need to update their display.

BRIEF DESCRIPTION OF THE DRAWINGS

FIG. 6 illustrates an exemplary CSS file before a change and after a change;

DETAILED DESCRIPTION

Figure 1:
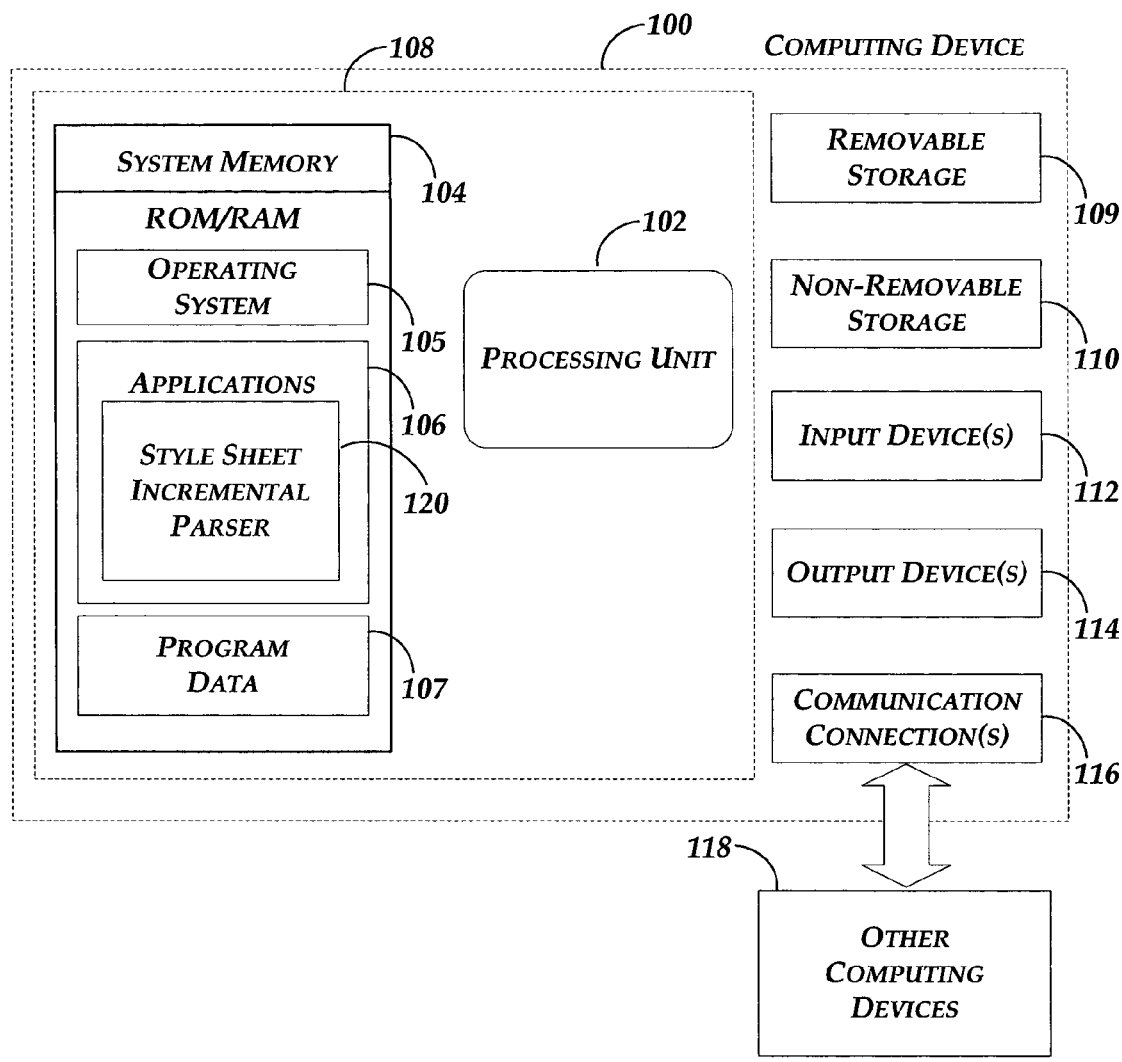
FIG. 1 illustrates an exemplary computing device.
Figure 2:
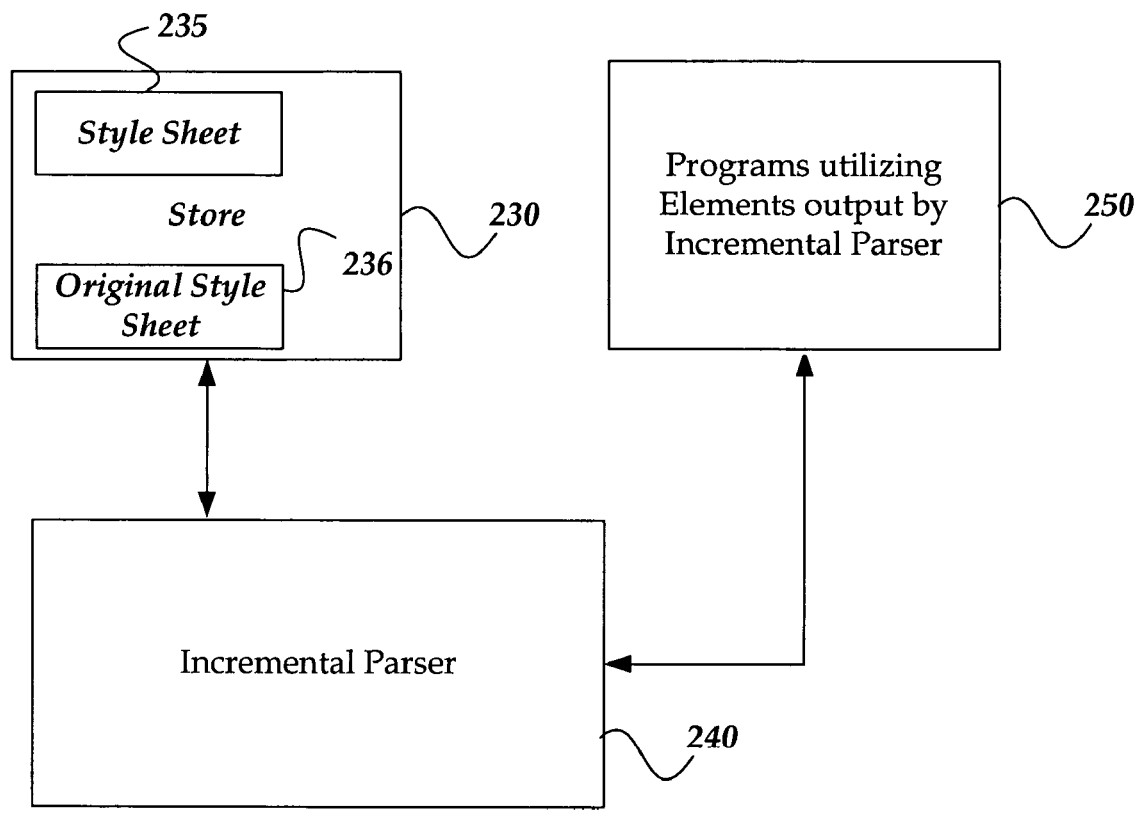
FIG. 2 is a functional block diagram generally illustrating an incremental parsing system.

FIG. 2 is a functional block diagram generally illustrating an incremental parsing system 200, in accordance with aspects of the invention. As illustrated, system 200 includes incremental parser 240, store 230 and programs utilizing elements 250. Incremental parser 240 may be implemented in hardware and/or software and may be configured to run on many different computing devices. For example, incremental parser 240 may run on a computing device as described in conjunction with FIG. 1 described below, a mobile device, or some other computing device that utilizes style sheets.

Store 230 is a data store that is configured to store style sheets, such as style sheet 235. According to one embodiment of the invention, the style sheets are Cascading Style Sheets (CSS's). The CSS define how elements are displayed and where they are positioned on the Web page. Instead of assigning attributes to each element on Web pages individually, a general rule may be created within the CSS that applies attributes whenever a Web browser encounters an instance of a particular element. Although only one style sheet (235) is shown within store 230, more style sheets may be stored. According to one embodiment, the original style sheet (236) is stored without changes until the incremental parsing on the new (updated) style sheet is completed.

Although store 230 is shown separately from incremental parser 240, the store may be implemented in many different ways. For example, the store may reside in RAM, ROM, a disk drive, or any other type of computer memory. The store may reside within the same computer as incremental parser and/or a separate computer from incremental parser 240. For example, style sheet 235 could be maintained on a store that is located on a server that is accessed by incremental parser 240 when needed. The server could be located on any network, internal or external to incremental parser 240. In this way, the style sheets could be stored at a central location allowing updates to be more easily made to the style sheets.

Incremental parser 240 is used to create and update the data structures that are used to represent the elements contained within a style sheet, such as style sheet 235. The data structures may then be used by programs that utilize the elements according to their needs. For example, a Web browser may use the data structures that represent the elements when the document is rendered. Instead of parsing the entire style sheet (235) when a change is made to the sheet, incremental parser 240 parses only a portion of the style sheet when a change is made to the style sheet. For example, incremental parser may be configured to parse the changed region within the style sheet that is affected by the change.

Generally, when a change is made to the style sheet (235), incremental parser 240 determines the changed region of the style sheet, parses the changed region, and updates the internal data structures that are affected by the change (See FIGS. 3-9 and related discussion). To determine the changed region the original style sheet (236) text is stepped through on a character by character basis searching for the first change.

Any method, however, may be used to determine the location of the first change. For example, a diff program could be used to determine the changes made to the style sheet text. Once the location of the change is determined, the length of the change is computed. According to one embodiment, the original text and new text are walked through backwards on a character by character basis looking for a change. Once a change location is determined the length is calculated based on the starting position and the ending position.

Incremental parser 240 is configured to parse the style sheet and output a list of elements. Upon an incremental change, the incremental parser outputs the elements 250 that are the data structures relating to the parsed style sheet that have changed.

When a change is made to style sheet 230, the style sheet is incrementally parsed by incremental parser 240. Incrementally parsing the style sheet when a change is made to the style sheet may provide many benefits. Some of the benefits may include, but are not limited to: better efficiency and memory usage as compared to parsing the entire style sheet each time a change is made; and updating the data structures changed as a result of the change to the style sheet instead of updating all of the data structures. For instance, if a change is made to a single rule within the style sheet, then only a single data structure needs to be updated as a result of parsing only a small portion of the style sheet text that has changed. For example, if only a single element within style sheet 235 is affected by the change, then only a single data structure element needs to be updated. Once an element is updated by the incremental parser, programs utilizing the elements (250) may update their display.

Figure 3:
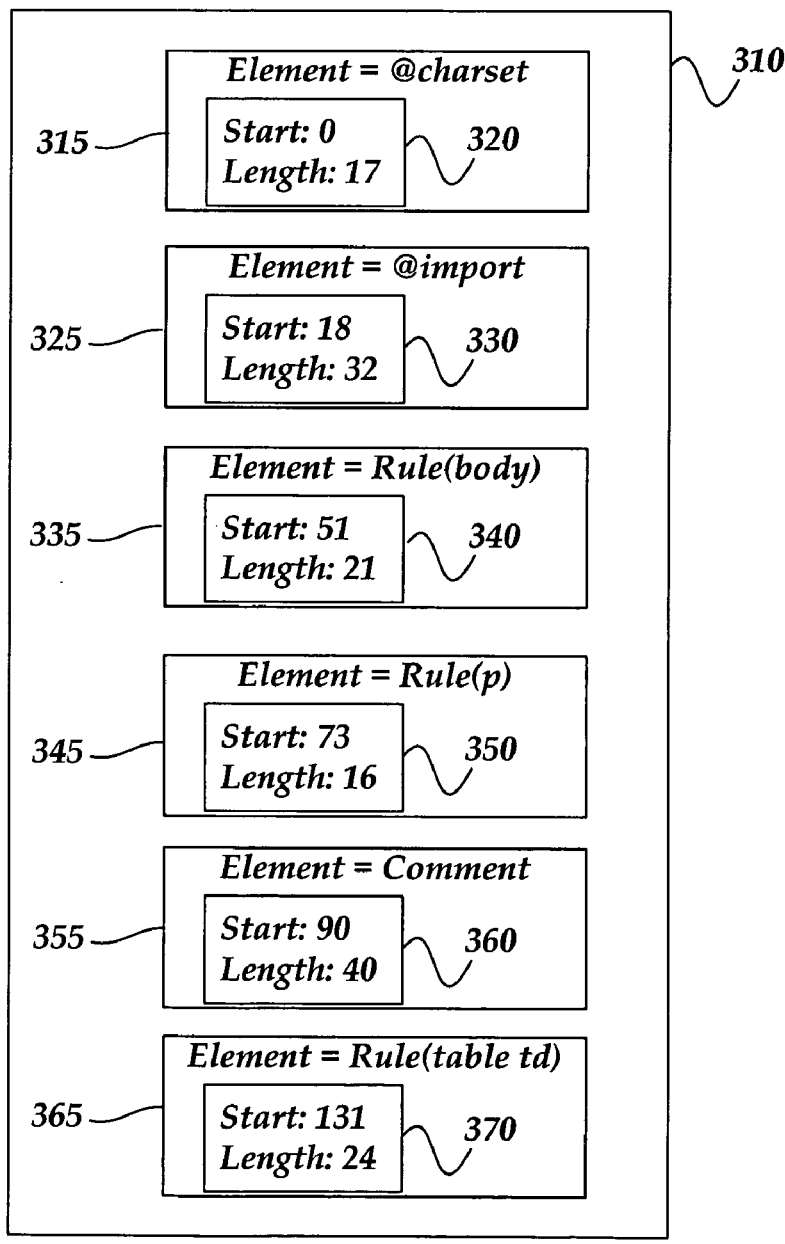
FIG. 3 illustrates an exemplary style sheet and a corresponding representation of the elements.

FIG. 3 illustrates an exemplary style sheet and a corresponding representation of the elements, in accordance with aspects of the present invention. Although the following description provides examples relating to Cascading Style Sheet (CSS) files, other style sheets may be incrementally parsed. According to one embodiment of the invention, a style sheet may be incrementally parsed when the rules within the style sheets can be represented as a series of elements.

The rules included within a CSS include a selector and properties. A rule typically takes the form of "selector {parameter: setting}." One example rule illustrated in style sheet 305 is rule 308: body {color: blue;} where "body" is the selector and the text within the brackets {color: blue} are the properties. The "selector" defines the HTML tags that the rule applies to and the "properties" define the visual styles for HTML tags that match the selector. Many rules are typically included within a style sheet.

According to one embodiment of the invention, after the style sheet is parsed by the incremental parser it is represented as an array, or list, of elements (310). There are many different types of elements that may be included within a style sheet, including, but not limited to: rules, comments, and import statements. A comment in CSS is similar to a comment within other programming languages, such as a comment in C code. For example, comments within some style sheets may be enclosed within an opening "/*" and a closing "*/." (See 309) An exemplary form of an import element is @import url ('another file.css') (307).

When style sheet 305 is parsed, the data structure that represents it is an array containing six elements. The elements in the array include: @charset (315); @import (325); Rule (body) (335); Rule(p) (345); Comment (355); and Rule(table td) (365). These elements may be represented using different types of data structures. For example, the elements may be stored in an array, as illustrated, in a list, such as a linked list, and the like.

According to one embodiment of the invention, the starting position of the element within the style sheet and the length of the text of the element are associated with each element. According to one embodiment, the starting position and the length are represented as a character number (see 320, 330, 340, 350, 360 and 370). For example, the very first element within style sheet 305 is @charset element 315 within array 310 has a starting position of 0 and a length of 17. The second element (325) has a starting position of 18 and a length of 32. Other methods may be used to store the position of the element within the style sheet. For example, the starting position and the ending position could be used to determine the position of the element within the style sheet. Using the position and the length it is possible to determine the location of each element within the style sheet text.

Figure 4:
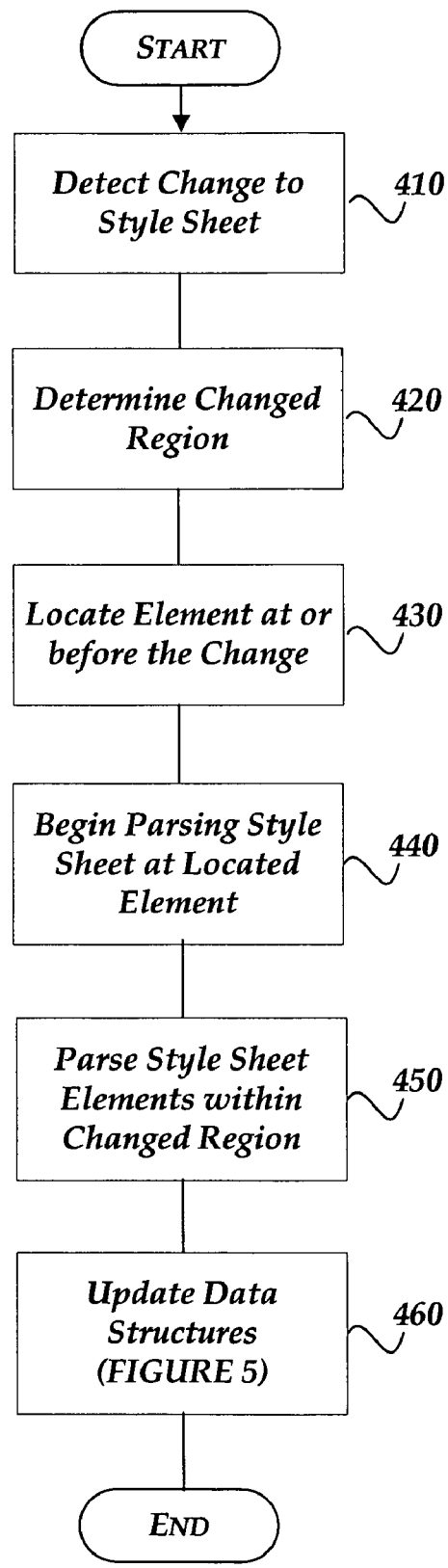
FIG. 4 illustrates a process for incrementally parsing a style sheet.

FIG. 4 illustrates a process for incrementally parsing a style sheet, in accordance with aspects of the present invention. Initially, a parser is used to parse the entire style sheet and build the data structures that represent the elements that are contained within the style sheet (See FIGS. 2 and 3 and related discussion). After the initial parsing, when a user makes a change to the style sheet then only a portion of the style sheet text is parsed.

After a start block, the process flows to block 410 where a change to the original style sheet is detected. The change may be detected in many different ways. For example, a change may be detected once a user starts to type; when a user has finished typing within the style sheet; when the user hits the enter key, and the like.

Once a change to the original style sheet has been detected, the process moves to block 420 where the changed region within the style sheet is determined. According to one embodiment, the changed region is the range of the text that has been changed within the style sheet. The changed region is defined by a starting character position of the change along with the ending position that is based on the length of the text that has been changed (the "new text") and a length of the text that existed before the change (the "original text") (See example below).

Moving to block 430, an element that starts at or before the start location of the changed text is located within the style sheet. According to one embodiment, the first element within the style sheet that starts at or before the start location of the changed text is located. Since each of the elements maintains an associated position and length, a comparison of the positions to the start of the change can be determined.

Flowing to block 440, the parser is initialized such that it begins parsing the style sheet at the location of the element that is located at or before the change as determined at block 430. The parser may be started at any location within the style sheet. Instead of starting at the beginning of the style sheet each time, the parser is started at a location between any of the elements contained within the style sheet. For example, the parser could be started at any character position within the style sheet. According to one embodiment, the parser is started at a character position that begins a new element. The parser is also configured to output elements within the style sheet as they are encountered. For example, when the parser has processed an element that element is output. The parsing continues at block 450 until an element is parsed that begins after the end of the changed text in the new text (or until the end of the new text is reached).

Figure 5:
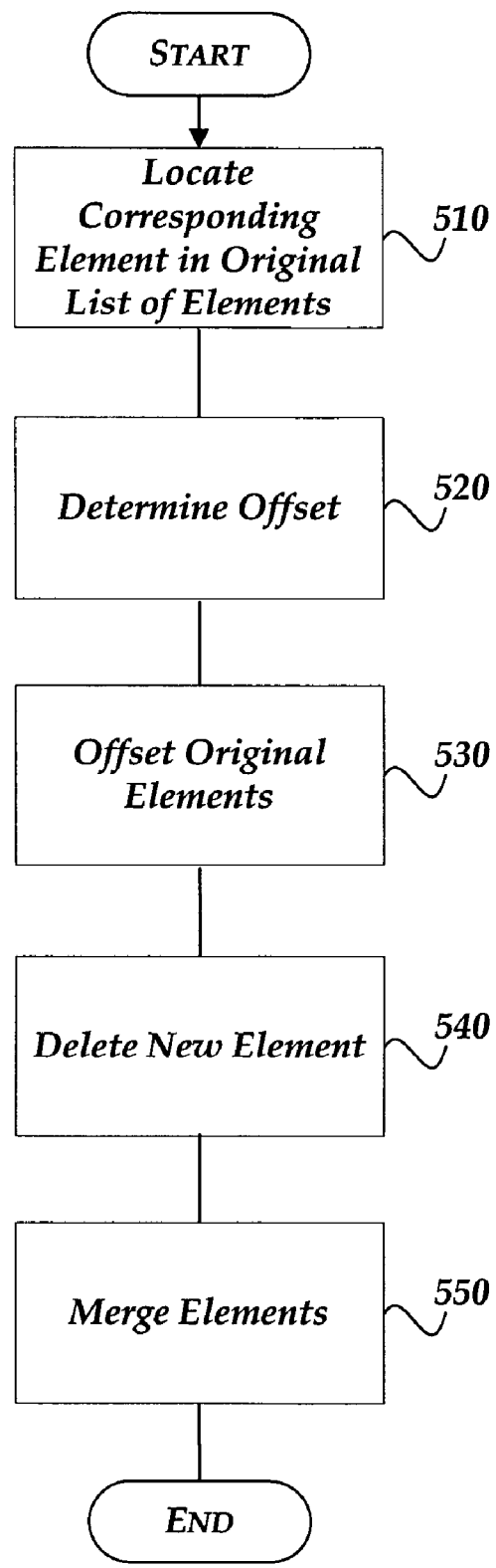
FIG. 5 shows a process for updating data structures in response to an incremental parse.

Moving to block 460, the data structures affected by the change are updated (See FIG. 5 and related discussion). The process then moves to an end block and returns to processing other actions.

FIG. 5 shows a process for updating data structures in response to an incremental parse, in accordance with aspects of the present invention.

After a start block, the process flows to block 510 where the corresponding element in the original list of elements is located that matches the last newly parsed element. According to one embodiment of the invention, the following equation is used to find the original element that is equivalent to the newly parsed element: $P_{original}=S_{original}-(S_{new}-P_{new})$ Where: $P_{original}$=the position of the element in the original style sheet text; $P_{new}$=the position of the last newly parsed element in the modified style sheet text; $S_{original}$=the length of the original text buffer for the element; and $S_{new}$=the length of the new text buffer for the new element.

Flowing to block 520, the offset of the new element in comparison to the original element is determined. The difference in the starting position for these two equivalent elements located within the original style sheet text and the new style sheet text is an offset value. The offset is defined as $P_{new}-P_{original}$. There is an equivalent element whenever the end of the new text wasn't reached while parsing the new elements.

Moving to block 530, the original elements are offset by the determined offset. Starting at the element that matched the last newly parsed element each element's text position is offset by the offset determined in block 520.

Transitioning to block 540, the last newly parsed element may be deleted since it matches one of the elements contained within the original list.

Moving to block 550, the newly parsed elements are merged with the original elements creating a single list of elements. According to one embodiment, the arrays containing the elements from the original elements and the new elements are merged. The process then moves to an end block and returns to processing other actions.

FIGS. 6-9 show an example of incrementally parsing a CSS file that has been incrementally changed, in accordance with aspects of the invention.

FIG. 6 illustrates an exemplary CSS file before and after a change, in accordance with aspects of the invention. The exemplary CSS file before the change (602) includes the following text: "body {color: blue;}" (605); "p {margin: 0;}" (610); "/* TODO: add a rule here */" (615); and "table td {color: red;}" (620).

The CSS file after making an incremental change (650) includes the following text: "body {color: blue;}" (655); "p {margin: 0;}" (660); ".foo {padding: 0;}" (665); and "table td {color: red;}" (670).

Referring to the original CSS text (602) and the modified CSS text (650) it can be determined that the comment (615) was deleted and a new rule (665) was added. The starting character position and ending position of the text is shown above each line of text within the original text (602) and the new text (650). The length of the text for each line may be determined from these two positions.

Figure 7:
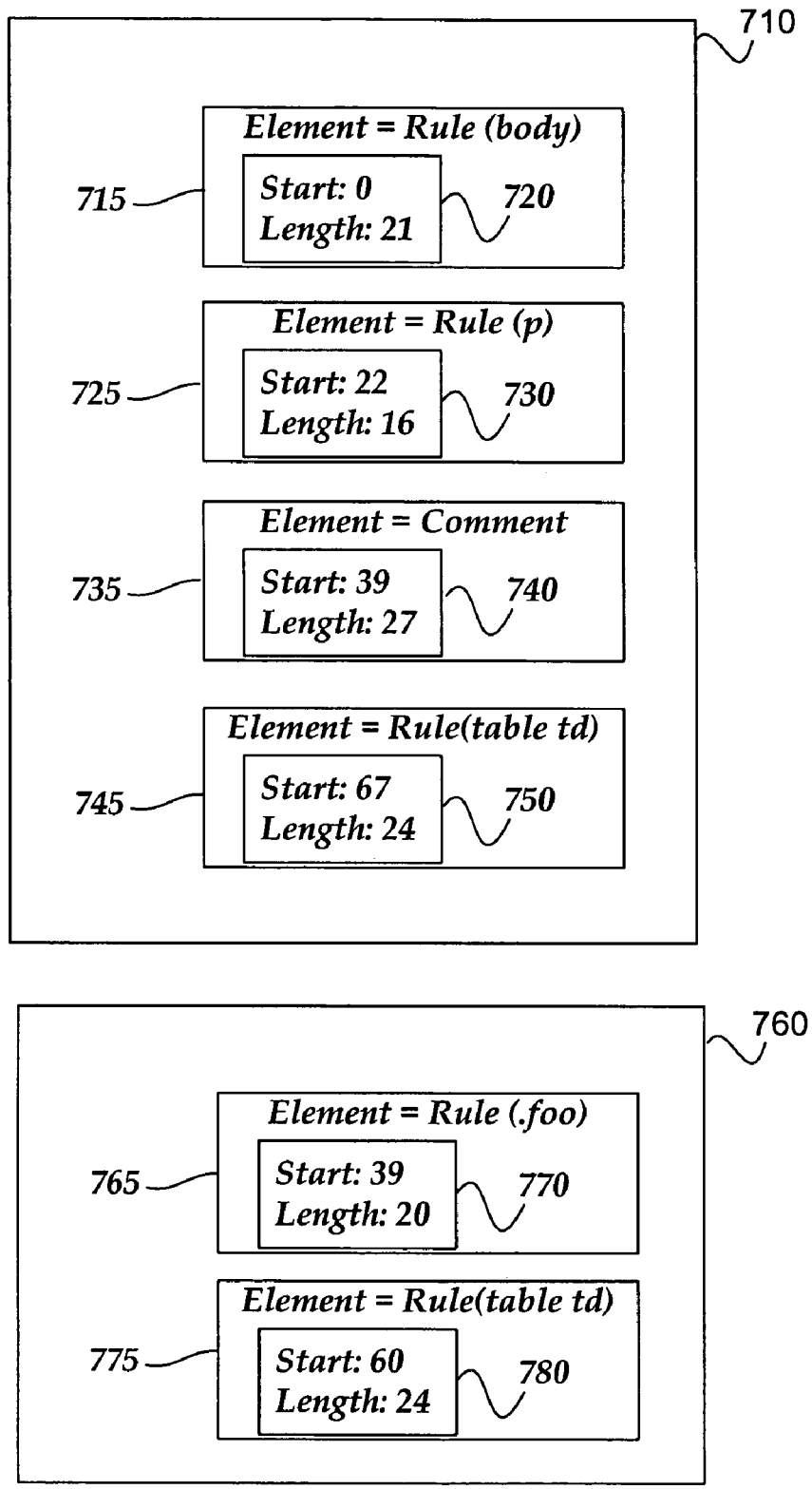
FIG. 7 shows the elements for the original style sheet before the change and the newly parsed elements after the change.

FIG. 7 shows the elements for the original style sheet before the change and the newly parsed elements after the change, in accordance with aspects of the invention. When style sheet 602 illustrated in FIG. 6 is initially parsed, the array (710) of four elements (715, 725, 735 and 745) is created. The elements include: a rule(body) having a start position of 0 and a length of 21 (720); rule (p) having a start position of 22 and a length of 16 (730); a comment having a start position of 39 and a length of 27 (740); and a rule (table td) having a start position of 67 and a length of 24 (750).

As discussed above, the parser determines the changed region. By comparing the original CSS text (602) to the new text (650) illustrated in FIG. 6 it can be determined that the change starts at character 39. The length of the element in the original text is 27 (740) whereas the length of the change in the new text is 20 (770). Moving to the next step in the process, the first element is located within the original style sheet that is at or before the change. Since the comment (735) started at the beginning of the changed text, the comment at start position 39 within the original style sheet is found for this step.

Using this determined location, the parser is initialized to begin parsing at character position 39 in the new CSS text and to parse the new CSS elements within the changed region.

The newly parsed CSS elements (765 and 775) are shown in array 760. The elements include: a rule(.foo) having a start position of 39 and a length of 20 (770) and rule (table td) having a start position of 60 and a length of 24 (780).

The parser stops after the "table td" rule since any further rules would begin outside the changed region.

Figure 8:
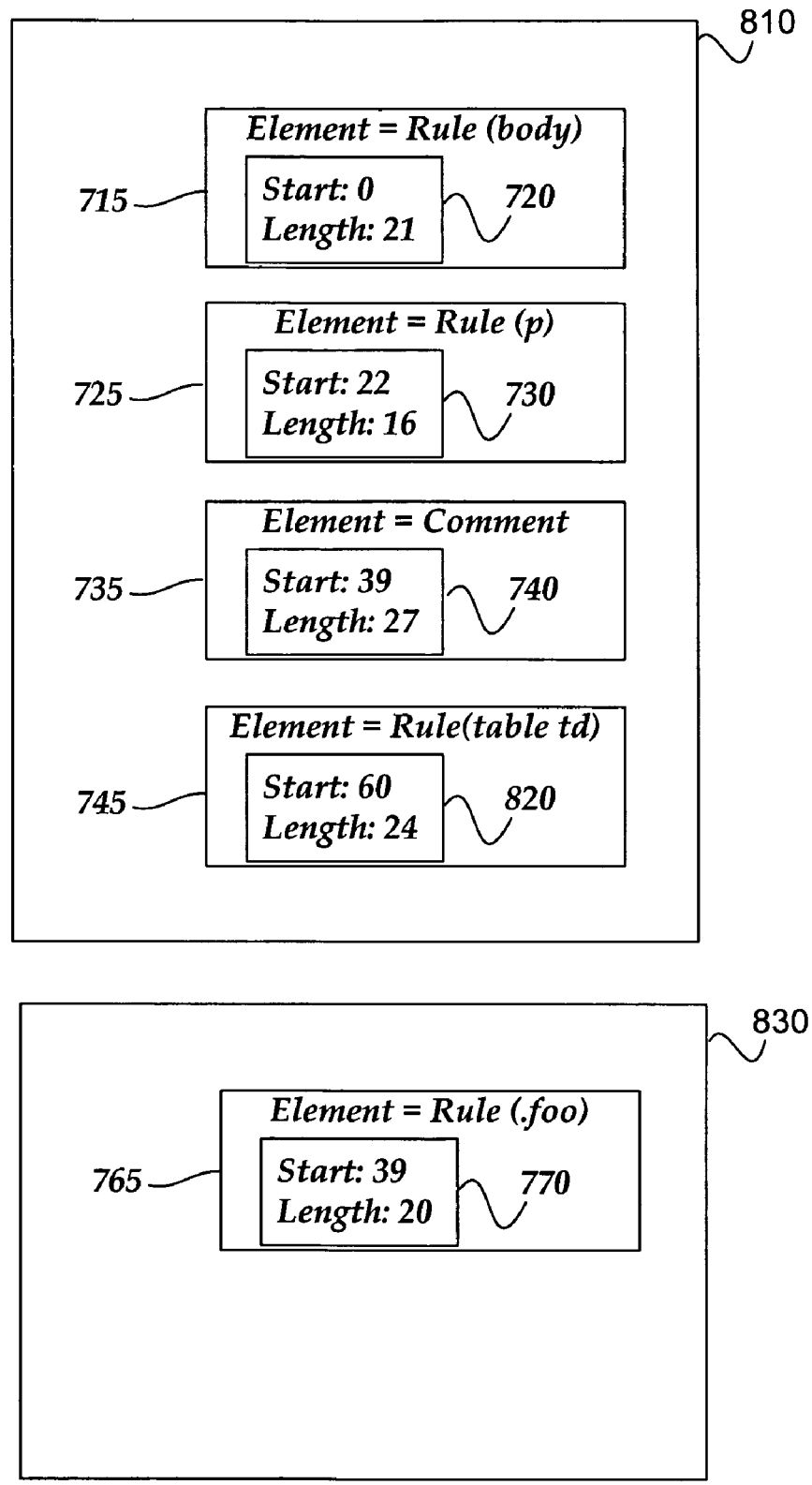
FIG. 8 shows the original element array having an offset applied to the affected elements.

FIG. 8 shows the original element array having an offset applied to the affected elements, in accordance with aspects of the invention.

The last newly parsed element in the array of new elements (830) is now mapped back to the original element array (810). Using the formula: $P_{original}=S_{original}-(S_{new}-P_{new})$ discussed above results in $P_{original}=91-(84-60)=67$ where 91 is the length of the original text and 84 is the length of the new text. Since $P_{original}$ is 67, and the 4$^{th}$ element in the original array starts at position 67, the 2$^{nd}$ newly parsed element (775) is equal to the 4$^{th}$ original element (745).

Determining the offset of the original elements using the formula $P_{new}-P_{original}=60-67=-7$. Starting at the 4$^{th}$ original element (745) the start positions are modified in array 810 by −7. Referring to box 820 shows that the start position of the Rule (table td) element (745) has been changed to 60 from the start position of 67 as shown in box 750 of FIG. 7.

The last newly parsed element (775 in FIG. 7) is now deleted from array 830 since the element is already in the original array (810). The newly parsed element array (830) now has only one entry, element 765.

Figure 9:
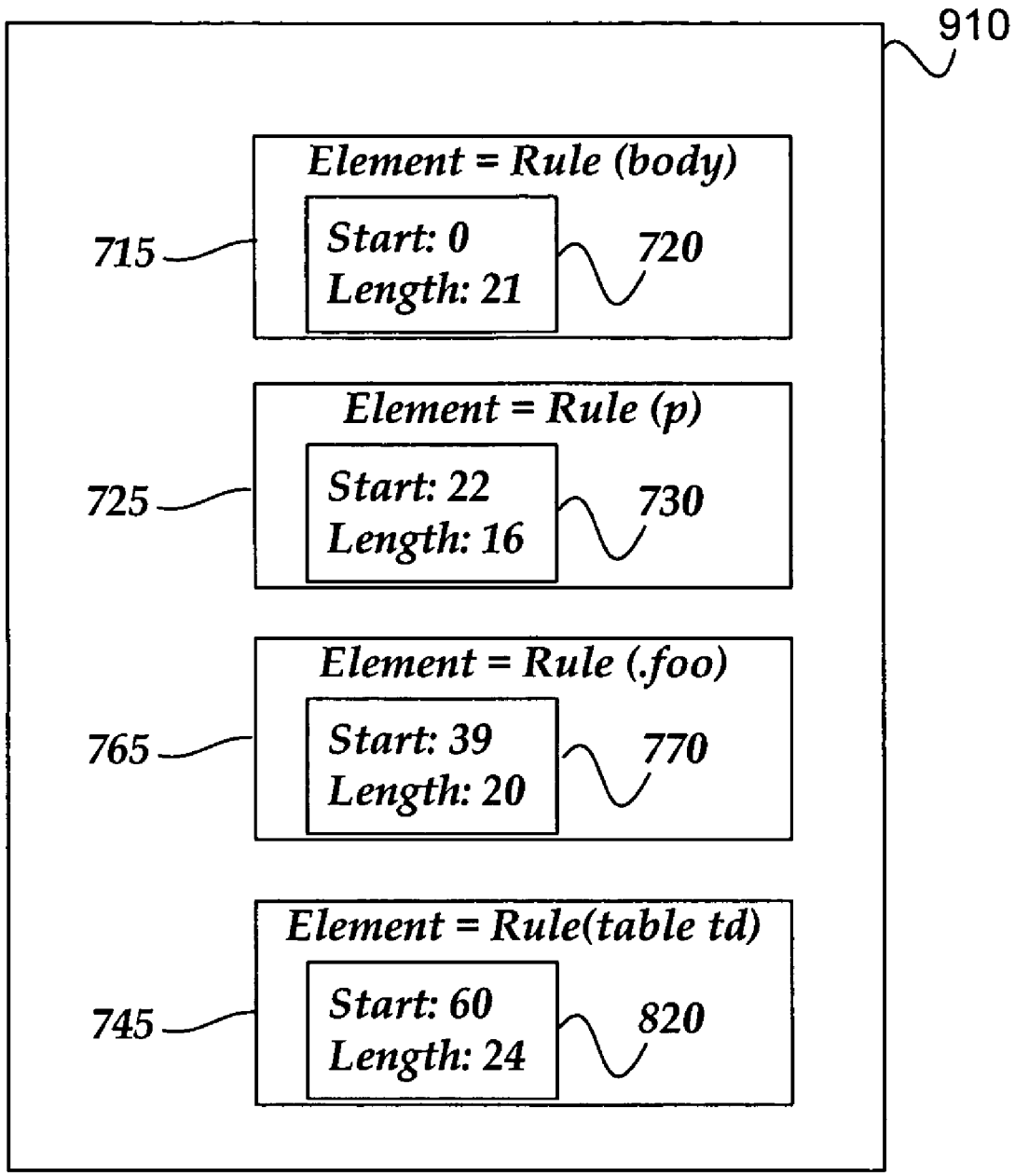
FIG. 9 illustrates the merged list of elements, in accordance with aspects of the present invention.

FIG. 9 illustrates the merged list of elements, in accordance with aspects of the invention. Merging the elements from the original array and the new array of elements illustrated in FIG. 8 results in array 910. At this point, the incremental parsing is completed and the affected data structures by the incremental change have been updated. As can be seen, the comment element has been removed and the rule (.foo) element has been positioned within the original array at this position. The elements within array 910 may be stored and accessed during the next incremental parse.

Illustrative Operating Environment

With reference to FIG. 1, one exemplary system for implementing the invention includes a computing device, such as computing device 100. In a very basic configuration, computing device 100 typically includes at least one processing unit 102 and system memory 104. Depending on the exact configuration and type of computing device, system memory 104 may be volatile (such as RAM), non-volatile (such as ROM, flash memory, etc.) or some combination of the two. System memory 104 typically includes an operating system 105, one or more applications 106, and may include program data 107.

In one embodiment, application 106 may include an incremental parsing program 120. This basic configuration is illustrated in FIG. 1 by those components within dashed line 108.

Computing device 100 may have additional features or functionality. For example, computing device 100 may also include additional data storage devices (removable and/or non-removable) such as, for example, magnetic disks, optical disks, or tape. Such additional storage is illustrated in FIG. 1 by removable storage 109 and non-removable storage 110. Computer storage media may include volatile and nonvolatile, removable and non-removable media implemented in any method or technology for storage of information, such as computer readable instructions, data structures, program modules, or other data. System memory 104, removable storage 109 and non-removable storage 110 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 100. Any such computer storage media may be part of device 100. Computing device 100 may also have input device(s) 112 such as keyboard, mouse, pen, voice input device, touch input device, etc. Output device(s) 114 such as a display, speakers, printer, etc. may also be included.

Computing device 100 may also contain communication connections 116 that allow the device to communicate with other computing devices 118, such as over a network. Communication connection 116 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer-implemented method for incrementally parsing a style sheet, comprising:
   determining when a change is made to the style sheet; wherein the style sheet includes rules that are parsed; wherein the parsed rules comprise an original list of elements;
   determining a changed region within the style sheet;
   determining a portion of the style sheet to parse based on the changed region; wherein the portion of the style sheet to parse includes elements that are at least partially within a starting position of the change and at least partially within an ending position of the change;
   parsing the portion of the style sheet; wherein parsing the portion of the style sheet creates a new list of elements;
   updating data structures that represent elements from both the original and new list of elements that were affected by the change that was made to the style sheet and removing those elements from the new list of elements that are also present in the original list; wherein updating the data structures comprises updating a position of the elements within the list;
   merging the remaining new list of elements within the original list of elements; wherein the new elements are applied to affect a style utilizing a processing unit on a computing device.

2. The method of claim 1, wherein determining the portion of the style sheet to parse comprises determining a location of each element within the style sheet that is near the change that is made to the style sheet.

3. The method of claim 1, further comprising storing the position for each element within the style sheet, wherein the position may be used to locate the element within the style sheet.

4. The method of claim 3, wherein storing the position includes storing a length of the element.

5. The method of claim 1, further comprising updating a display of any new element.

6. The method of claim 1, further comprising determining an offset for the elements and offsetting the elements.

7. A computer-readable storage medium having computer-executable instructions for parsing a style sheet, comprising:
   detecting when a change is made to the style sheet; wherein the style sheet includes rules that are parsed; wherein the parsed rules comprise a list of original elements;
   determining a changed region within the style sheet, wherein the changed region includes a starting location that indicates the start of the change; wherein the changes region includes elements that are at least partially within the staffing location and at least partially within an ending position of the change; and
   parsing the changed region of the style sheet; wherein parsing the changed region of the style sheet creates a new list of elements;
   updating data structures that represent elements from both the original and new list of elements that were affected by the change that was made to the style sheet and removing those elements from the new list of elements that are also present in the original list; wherein updating the data structures comprises updating a position of the elements within the list;
   merging the remaining new list of elements with the list of original elements; wherein the new elements are applied to affect a style utilizing a processing unit on a computing device.

8. The computer-readable storage medium of claim 7, wherein determining the changed region within the style sheet comprises determining a location of any element within the style sheet that is located near the change that is made to the style sheet.

9. The computer-readable storage medium of claim 7, further comprising locating an original element within the original list of elements that corresponds to the location of a new element within the style sheet.

10. The computer-readable storage medium of claim 9, further comprising determining an offset of the new element from the original element.

11. The computer-readable storage medium of claim 10, further comprising offsetting the original elements.

12. The computer-readable storage medium of claim 7, further comprising storing a location and a length for each element within the style sheet.

13. A system for incrementally parsing a style sheet, comprising:
- a processing unit and a computer-readable storage medium;
- a data store that is configured to store a style sheet; wherein the style sheet includes rules that are parsed; wherein the parsed rules comprise an original list of elements; and
- an incremental parser that is configured to perform actions executed by the processing unit, including:
  - detecting when a change is made to the style sheet;
  - parsing a portion of the style sheet in response to the change; wherein the portion of the style sheet that is parsed includes elements that are at least partially within a starting position of the change and at least partially within an ending position of the change; and
  - outputting at least one new element into a new list of elements that has changed as a result of the change to the style sheet;
  - updating data structures that represent elements within both the original and new list of elements that were affected by the change that was made to the style sheet and removing those elements from the new list of elements that are also present in the original list; wherein updating the data structures comprises updating a position of the elements within the list; and
  - merging the remaining new list of elements with the list of original elements; wherein the new elements are applied to affect a style.

14. The system of claim 13, wherein parsing the portion of the style sheet comprises determining a changed region of the style sheet and locating an element near the change from which to staff parsing.

15. The system of claim 13, further comprising determining an offset and offsetting elements within the list of elements using the determined offset.

16. The system of claim 13, further comprising storing position information for each element within the style sheet.